United States Patent [19]
Höfer et al.

[11] Patent Number: 5,166,710
[45] Date of Patent: Nov. 24, 1992

[54] CONTACT LENS AND PROCESS FOR THE MANUFACTURE THEREOF

[75] Inventors: Peter Höfer, Aschaffenburg; Peter Hagmann, Hösbach-Bahnhof; Martin Reichner, Aschaffenburg; Peter Herbrechtsmeier, Königstein, all of Fed. Rep. of Germany

[73] Assignee: Ciba-Geigy Corporation, Ardsley, N.Y.

[21] Appl. No.: 642,606

[22] Filed: Jan. 17, 1991

[30] Foreign Application Priority Data

Jan. 24, 1990 [CH] Switzerland .......................... 224/90

[51] Int. Cl.⁵ .................................................. G02C 7/04
[52] U.S. Cl. .................................. 351/160 R; 351/177
[58] Field of Search ............... 351/160 R, 160 H, 161, 351/162, 177

[56] References Cited

U.S. PATENT DOCUMENTS

| | | | |
|---|---|---|---|
| 3,594,074 | 7/1971 | Rosen | 351/160 |
| 4,171,878 | 10/1979 | Kivaev et al. | 351/160 R |
| 4,180,308 | 12/1979 | Mancini et al. | 351/160 H |
| 4,193,672 | 3/1980 | Trombley et al. | 351/160 R |
| 4,239,353 | 12/1980 | Koller | 351/160 H |
| 4,640,594 | 2/1987 | Berger | 351/160 R |
| 4,820,038 | 4/1989 | Seger | 351/160 H |
| 4,890,911 | 1/1990 | Sulc et al. | 351/177 X |

FOREIGN PATENT DOCUMENTS

| | | | |
|---|---|---|---|
| 2248527 | 5/1975 | France | 351/160 H |
| 2031178 | 4/1980 | United Kingdom . | |

*Primary Examiner*—Scott J. Sugarman
*Attorney, Agent, or Firm*—William G. Hervey; Edward McC. Roberts

[57] ABSTRACT

A contact lens that consists of gas-permeable, especially oxygen-permeable, lens material and has a supporting edge which rests on the sclera and is covered at least partially by both eyelids and absorbs the forces acting on the lens as the lid closes, the rear face of the lens in the region of the cornea being spaced from the surface of the cornea. By ensuring the exchange of lachrymal fluid between the contact lens and the surface of the eye, metabolic products are transported away and the supply of oxygen to the cornea is assisted. For that purpose, channels may be provided on the lens or the lens may be caused to rotate.

17 Claims, 4 Drawing Sheets

CONTACT LENS AND PROCESS FOR THE MANUFACTURE THEREOF

The invention relates to a contact lens consisting of gas-permeable, especially oxygen-permeable, lens material, and to a process for the manufacture of such a contact lens.

Because they can usually adapt better to the shape of the eyeball, so-called soft contact lenses are widely used. The sought-after flexibility of the lens material does, however, have its disadvantages. For example, U.S. Pat. No. 4,820,038 (WO-A-8801398) describes a soft lens having an especially small thickness in the middle. Owing to its flexibility, the contact lens is in direct contact with the cornea, and the forces that act on the lens as the eyelid closes are transmitted directly to the cornea. If one further considers that the special shaping of the edge of the lens causes a small upward and downward movement of the lens, it is easy to appreciate the resulting irritation of the eye, which detracts from the wear comfort.

The contact lens described in U.S. Pat. No. 3,594,074 (DE-A-19 39 157) is also constructed in such a manner that it rests on the cornea. Accordingly, pressure forces on the lens are transmitted directly to the cornea and lead to mechanical irritation of the eye. Furthermore, the materials used have a relatively low oxygen-permeability, thus resulting overall in a contact lens that appears worth improving both with regard to the oxygen supply to the cornea and with regard to the wear comfort.

U.S. Pat. No. 4,239,353 (DE-B-27 49 144) describes a soft contact lens that has a specially constructed soft edge in order to increase the tearability of the lens in the edge region and to improve its adaptability to individual eyeball shapes. With this lens also, forces are transmitted directly to the cornea and hence the wear comfort is impaired.

U.S. Pat. No. 4,180,308 (DE-A-27 48 481) also describes a soft contact lens. Similarly to the lenses described above, this lens also may impair the wear comfort as a result of the direct transmission of pressure to the cornea.

GB-A-2,031,178 describes a further soft contact lens. In this lens, attempts are made to avoid movement of the lens on the eye by means of special construction of the edge regions. The considerations and disadvantages already discussed in connection with the previously described soft contact lenses also apply to this lens.

Since the lens materials used frequently do not have a sufficient oxygen-permeability, attempts are made to remedy that shortcoming by means of special constructions of the contact lens. For example, U.S. Pat. No. 4,640,594 describes a contact lens having a pumping zone of bellows-like construction. Since the lens material employed has only a low oxygen-permeability, an adequate supply of oxygen to the cornea is to be ensured by a pumping round of the lachrymal fluid. Apart from the fact that this method of supplying oxygen to the cornea is often still inadequate, the special construction of the pumping zone arranged in the edge region of the lens, together with the large diameter required for the contact lens, leads to a not inconsiderable irritation of the eye in the region of the lid and hence to a reduction of the wear comfort.

Considerations regarding contact lenses, in particular also those made from an oxygen-permeable hard or flexible material, have hitherto been based on the assumption that, in the case of scleral lenses, that is to say lenses whose outer edge extends as far as the sclera of the eye, the supply of oxygen to the eye is inadequate. For example, U.S. Pat. No. 4,193,672 (DE-A-29 38 957) proceeds on the assumption that oxygen access to a large part of the eye is blocked in the case of such lenses. In order to remedy this, therefore, lenses of smaller and smaller overall diameter have been produced. The diameters in the case of known contact lenses are, therefore, between 5.6 and 9 mm. This is intended to ensure an adequate supply of oxygen to the cornea by increasing the surface area of the cornea not covered by the lens in proportion as the overall diameter becomes smaller. Hitherto, therefore, attempts have been made to guarantee the oxygen supply to the cornea by means of a smaller lens diameter and a certain mobility of the lens on the eye. At the same time, however, it was necessary to provide measures for improving the centring behaviour of the small lenses.

A small lens diameter necessarily entails that the lids, or the edges of the lids, initially come into contact with the edge of the contact lens as the lid closes and have to slide over the edge as the blinking action progresses. Since the edges of the lids are especially sensitive to pain, a long habituation phase is required for such lenses, which often leads to an insufficient blinking action of the eyelids. This in turn brings with it the danger of a deterioration in the metabolic situation on the eye. In order to improve spontaneous tolerability, considerable effort has therefore been expended in the shaping of the edge of contact lenses.

The problem of the invention is, therefore, to provide a contact lens consisting of gas-permeable, especially oxygen-permeable, lens material, in which a trouble-free supply of oxygen to the cornea is ensured and the tolerability, and hence the wear comfort, is considerably improved.

This problem is solved according to the invention in that, when the lens body is placed on the eye the lens body has a supporting edge which rests on the sclera and is covered at least partially by both eyelids and absorbs the forces acting on the lens as the lid closes and transmits them to the region of the sclera;

the rear face of the lens in the region of the cornea is spaced from the surface of the cornea so that there is always a film of lachrymal fluid there; and means for transporting the lachrymal fluid for the purpose of exchanging the lachrymal film between the rear face of the lens body and the surface of the eye are provided in the region of the supporting edge.

This provides the possibility of circulating the lachrymal fluid so that an exchange or transport of lachrymal fluid from the region between the surface of the cornea and the rear face of the lens inside the supporting edge to the outside and in the opposite direction is ensured. These means for transporting the lachrymal fluid are preferably constructed as channels and may extend in the lens material or at the rear face in the region of the supporting edge.

It has been found that, if adaptation of the lens according to the topography of the eye is carried out in the manner according to the invention, it is possible to use also hard or flexible contact lenses having diameters distinctly larger than those customary hitherto, there being obtained, in addition to the necessary oxygen supply to the cornea, a considerable improvement in spontaneous tolerability.

The lens diameters may range from 10 to 17 mm depending on the size of the eye.

Preferably, lens diameters of from 12.5 to 13.5 mm are used.

For transporting the lachrymal fluid, the lens body may be so shaped in the region of the edge zone that the lens body placed on the eye rotates (turbo effect) owing to the dynamics of the closing of the lid. The lens body may for that purpose further be constructed to be reversibly elastically deformable in order to obtain a pumping effect caused by the closing of the lid.

The material used for the lens body is preferably a gas-permeable, especially oxygen-permeable, material.

The larger diameter results in a better spontaneous tolerability and lower stress on the cornea. As a result of the invention there are also achieved a definite provision of a sufficiently thick lachrymal film between the contact lens and the cornea, improved optical imaging properties, a simplification of the adaptation to different curvatures or geometries of the cornea and hence considerable rationalising effects in the manufacture of hard and flexible contact lenses and their parameter distribution.

The advantages are obtained in particular by the combined use of the following features:

means for a sufficient supply of oxygen to the surface of the eye;

absorption of the forces acting on the contact lens, caused especially by the closing of the lid, in the region of the insensitive sclera where the supporting edge at the rear face of the lens rests on the eye;

a sufficient gap in the region of the cornea between the rear face of the lens and the surface of the cornea lying opposite, this spacing being determined taking into account the overall topography of the eye, especially in the region in which the supporting edge rests on the sclera, and the surface of the cornea, by three-dimensional scanning or three-dimensional measuring methods and recording their geometry;

when the lens is placed on the eye, the edge of the lens is located both at least partly under the upper eyelid and under the lower eyelid, so that striking of the eyelids against the edge of the contact lens as the eyelids close or during blinking is avoided owing to the sufficiently large overall diameter of the lens;

an independent optimisation of the shaping of the edge, especially in the region of the supporting edge, and of the shaping of the optical zone of the lens on the basis of the scanned topography of the eye;

manufacture of lenses having relatively large diameters of from 10 to 17 mm, preferably from 12.5 to 13.5 mm.

Since the optical zone of the lens and the supporting edge of the contact lens can be accommodated within an enlarged overall diameter, the optical zone and the supporting edge can be distinctly spatially separated from each other, with the result that separate optimisation can be achieved.

This optimisation can be achieved in advantageous manner using a method in which the topography of the cornea and of the sclera, at least in the region in which the lens rests on the eye, is scanned three-dimensionally, and the corresponding geometrical values are stored.

According to those stored geometrical values, the lens can then be shaped from a lens blank, by moulding or by machining with cutting tools. The latter can be carried out with the aid of correspondingly controlled automatic lathes. The lens may also be manufactured by laser-machining.

Using the available gas-permeable lens materials that have a high oxygen-permeability, the supply of oxygen to the cornea can be ensured even when the latter is completely covered by the contact lens, for example of hard or flexible construction, owing to the direct transport of oxygen through the contact lens material. Suitable shaping of the rear face of the contact lens provides for a continuous lachrymal film over the cornea and, hence, for the necessary oxygen supply and the necessary metabolism. By suitable measures, such as, for example, a defined rotation of the lens by turbo effect, fenestration, ventilation channels, grooves, channels and the like at suitable locations, it is possible to achieve the necessary exchange of lachrymal fluid in the region of the contact lens resting on the eye. Thereby, transportation of decomposition products, especially dead epithelial cells, towards the outside is also achieved. This occurs in addition to the direct oxygen permeation, by means of the oxygen dissolved in the lachrymal fluid.

This ensures an exchange of the lachrymal film under the contact lens. This exchange of the lachrymal film makes a not inconsiderable contribution to the supply of oxygen to the cornea. When the contact lens is being worn, oxygen is supplied to the cornea in two components. Firstly, there is the oxygen that diffuses through the contact lens, which can be characterised by the mean transmissibility $Dk/L$. Secondly, the cornea is supplied with the oxygen that is dissolved in the lachrymal fluid.

By constant renewal of the lachrymal film between cornea and contact lens, that is to say at a high exchange rate of the lachrymal fluid, it is possible to ensure the supply of oxygen to the cornea even with those contact lenses which have only low transmissibilities. A contact lens having the corneascleral design, as is used in the invention, may in principle, therefore, also be made from materials having a low $Dk/L$ value. By suitable matching of the $Dk/L$ value of the contact lens material to the hydrodynamics, that is to say the exchange rate of the film of lachrymal fluid, it is possible to obtain an adequate supply of oxygen in the context of the desired wearing cycle. An average minimum requirement for oxygen transmissibility $Dk/L$ when the contact lens is worn by day is approximately $24.0 \pm 2.7 \times 10^{-9}$ $[(cm/s) \times (ml\ O_2/ml \times mm\ Hg)]$. If the contact lens is worn for an extended period, that value is $87.0 \pm 3.3 \times 10^{-9}$.

In an advantageous manner, as a result of the invention the contact lens does not rest in the region of the cornea on the surface of the cornea, that is to say, in the region of the cornea, the contact lens and the surface of the cornea are not in constant contact—in contrast to the contact lens disclosed in DE-OS 29 38 957. Accordingly, in the invention, the formation of "dead water areas", that is to say areas sealed to the outside in which the lachrymal film is confined between the rear face of the contact lens and the eye, is avoided. The invention ensures that there is a sufficient gap between the contact lens and the surface of the eye, while taking into account a favourable congruence of the rear face of the contact lens and the forward surface of the eye. The forces acting on the contact lens, especially as the lid closes, are absorbed outside the cornea and transmitted to the sclera. Mechanical stressing and irritation of the cornea are thereby considerably reduced. Consequently, at the cornea, a metabolic rhythm approaching that corresponding to an irritation-free situation is achieved. Owing to the reduced formation of decomposition products which is associated therewith, fewer deposits are formed in the case of the contact lens according to the invention.

Furthermore, owing to the minimal lid irritation, the potential irritation on the eye is considerably reduced, as a result of which spontaneous tolerability and also long-term tolerability are substantially improved. Both effects lead to a normalisation of the metabolism and, consequently, a reduced tendency towards the formation of deposits.

On account of the increased overall diameter of the lens in comparison with known lenses, it is also possible to achieve optimisation of the imaging properties of the optical zone, for example by using appropriate computing programs. Owing to the larger diameter of the optical zone, edge fringing and reflexes, such as may occur especially when contact lenses are worn in twilight, are avoided. Vision is thus distinctly improved even in twilight and at night or under unfavourable lighting conditions. This is especially important as far as driving is concerned. In this manner, the lens thus offers also an additional safety potential. The larger diameter of the optical zone also provides a wider range of possibilities with regard to shaping in the case of bifocal or multifocal contact lenses.

Since the lids no longer strike against the edge of the contact lens during blinking, it is no longer absolutely essential to provide a special edge shape, especially a rounded edge shape, in the region of the lids. In this manner, the possibility of adapting the edge shaping more to the requirements of the manufacturing process and to the properties of the material is obtained. Cracks and chipping of the edge are avoided, which considerably improves safety for the contact lens wearer.

All conventional lens geometries and combinations of lens geometries are possible for shaping the front and rear surfaces of the lens, especially in the optical region of the lens. For example, these geometries may be spherically single-curved, spherically multi-curved, aspherically single-curved, aspherically multi-curved, for example elliptical, bi-elliptical and multi-elliptical or toroidal. With the aid of these geometries it is possible to correct virtually all sight anomalies, such as, for example, myopia, hyperopia and presbyopia. In particular, a rational correction of astigmatisms is also possible. The adaptations nowadays relying on complicated bitoroidal, internally toroidal, peripherally toroidal and peripherally and frontally toroidal lens geometries are no longer necessary.

The lenses can be manufactured by all conventional processes, such as, for example, turning, laser-machining, swaging, injection-moulding, casting (semi-mould, full mould) or any combinations thereof. The manufacture of the lenses is preferably carried out according to the stored geometrical values of the topography of the eye which can be obtained with the aid of three-dimensional measuring methods. Subsequently, a turning process is preferably employed to produce the lens from a lens blank with cutting tools. Three-dimensional topographic scanning of the eye is possible, for example, with a measuring device called an "ECT 100 Corneal Topographer" manufactured by OPTIMED Inc., Alpharetta.

By means of the contact lens according to the invention, a high degree of wear comfort, comparable to that of a soft lens, is achieved, while all the advantages of hard flexible lenses are retained. Complicated special shapes for the correction of, for example, astigmatisms are no longer necessary. The adaptation can be considerably rationalised by a small number of internal parameters. Owing to the high spontaneous tolerability, the drop-out rate is greatly reduced. A considerable improvement in long-term tolerability is achieved. Owing to the rational manufacturing methods, the contact lens according to the invention can also be used as a disposable lens. The difficulties often encountered in wearing soft contact lenses, such as, for example, vascularisation, insufficient optical correction, etc., do not arise with the lens according to the invention.

The invention is described in more detail with reference to the embodiments shown in the Figures, in which.

Figure 1A:
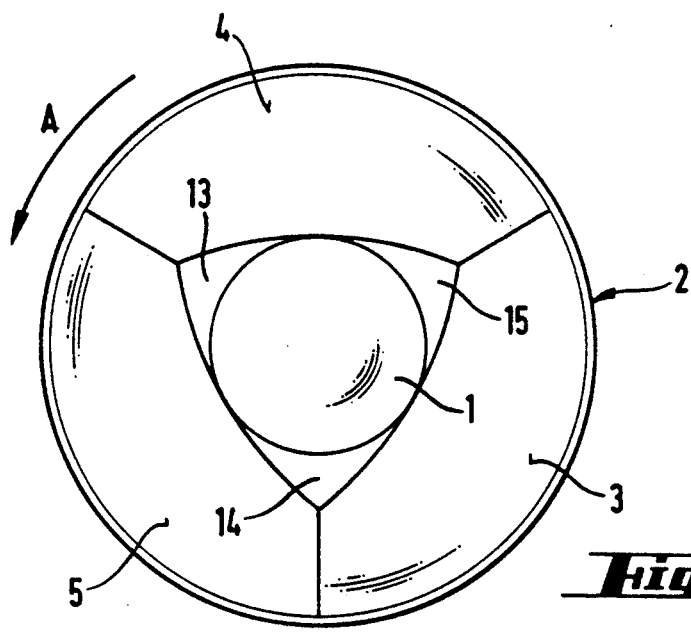
FIGS. 1a and 1b are views of the front face of one embodiment of a contact lens according to the invention.
Figure 1B:
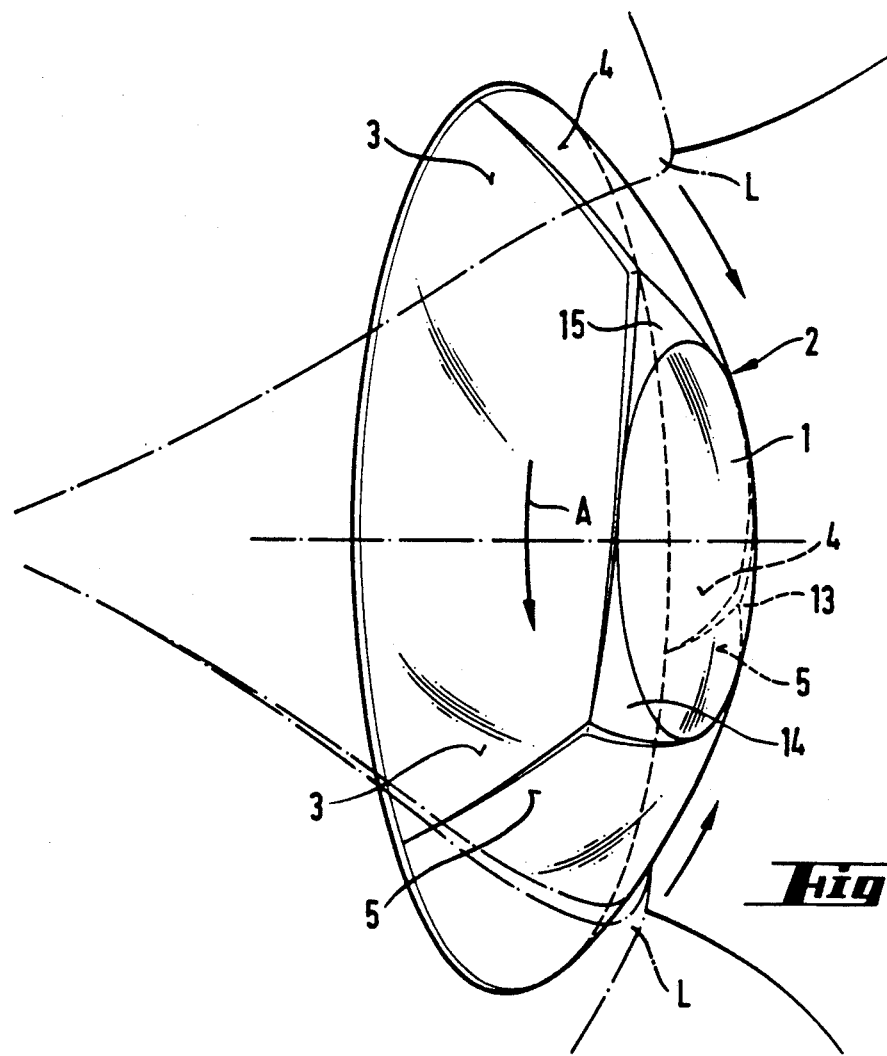
Figure 2A:
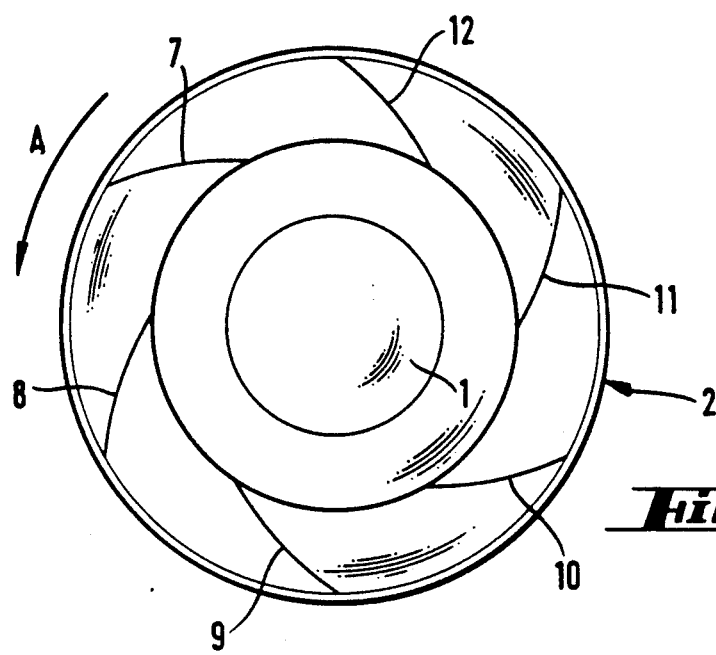
FIGS. 2a and 2b are views of the front face of a further embodiment of a contact lens according to the invention.
Figure 2B:
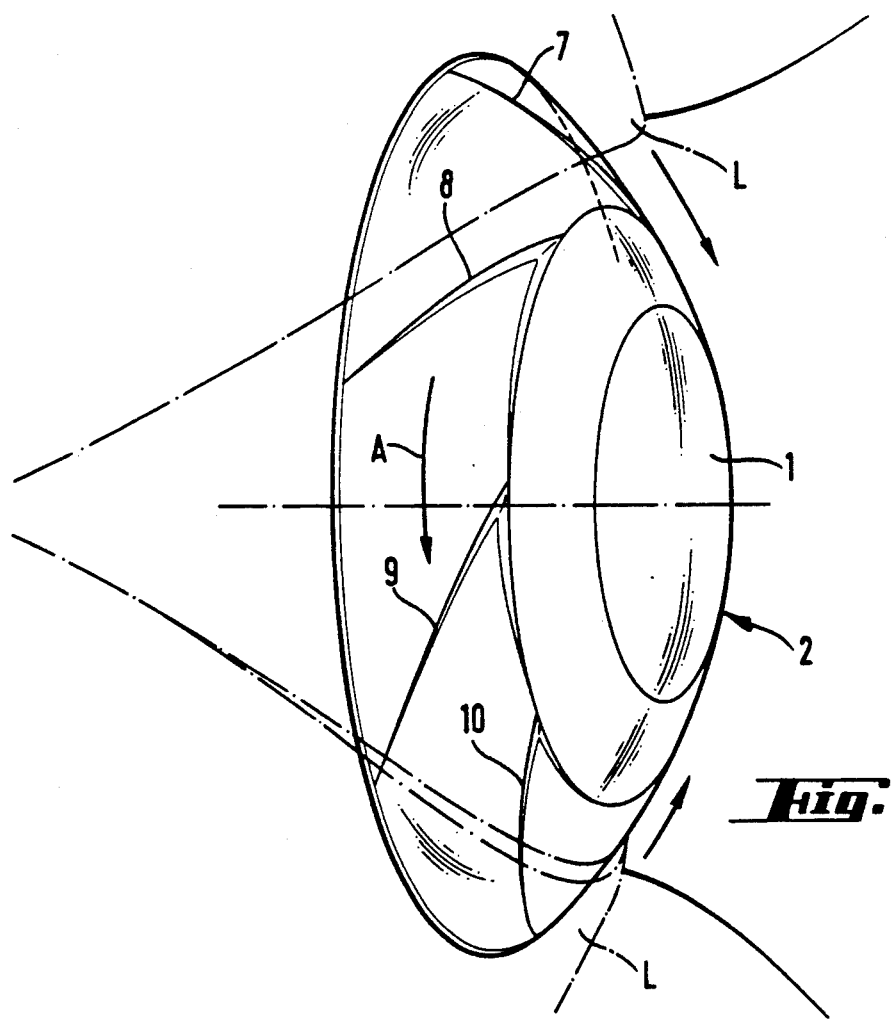

FIGS. 1a, 1b, 2a and 2b show embodiments of contact lenses in which rotation of the contact lens (turbo effect) on the eye occurs for the purpose of ensuring an exchange of the lachrymal film between the rear face of the contact lens and the surface of the eye. This rotation is achieved as a result of a special shaping of the front face of the contact lens in an edge zone outside an optical portion 1 of the contact lens. The special shaping in the edge zone is such that the rotation is caused by the dynamics of the closing of the lid. In the embodiment shown in FIG. 1a and 1b respectively, there are provided for that purpose, around the optical region 1 of the contact lens, three flattened zones 3, 4, 5 that adjoin one another. The flattening is such that, for example as a result of the closing of the lid, a rotation of the lens on the eye in the direction of an arrow A occurs. In the respective flattened zones 3, 4 and 5, the points designated 13, 14 and 15 are the highest points and, starting from those points 13, 14 and 15, the zones 3, 4 and 5 are flattened in the direction towards the edge of the lens and opposite the direction of rotation, which is indicated by the arrow A, towards the respectively adjacent zone. In the embodiment shown in FIG. 2a and 2b respectively, scoop-shaped curved elevations 7 to 12 are provided on the front face, which cause the lens body to rotate as a result of the closing of the lid.

It is known from DE-PS 24 15 108 to flatten two edge zones of the contact lens for dynamic stabilisation of the axial correction. What occurs therein, however, is not a rotation of the contact lens, but a stabilisation of the axes.

Figure 4:
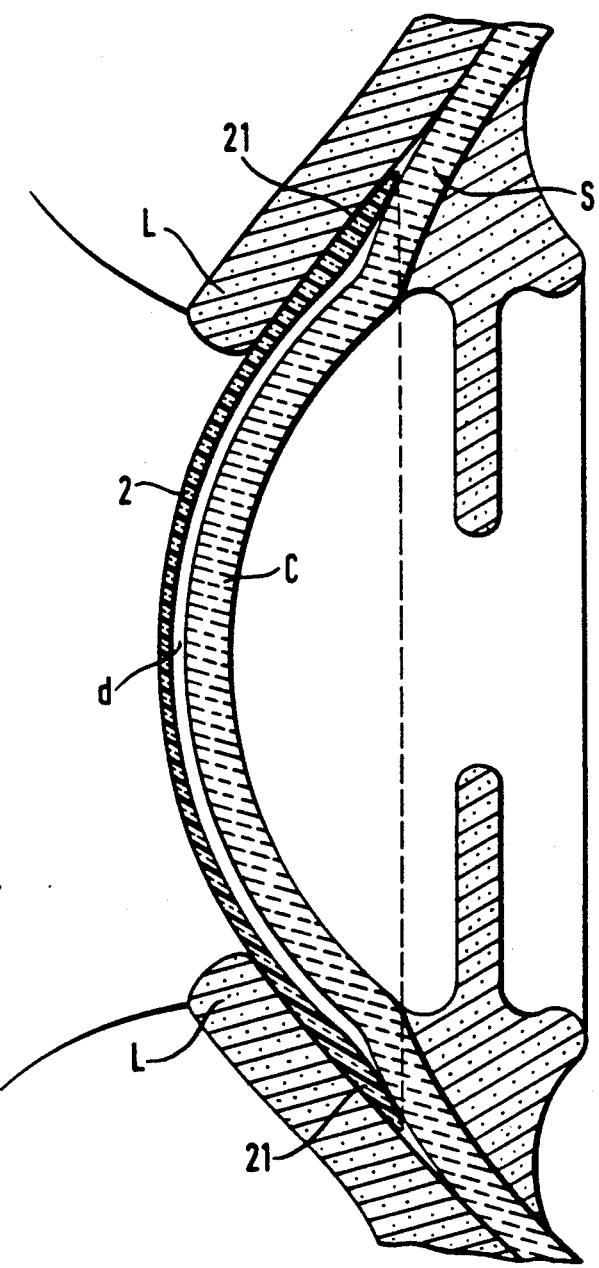
FIG. 4 is a schematic view of a contact lens placed on the eye.

FIG. 4 shows schematically a contact lens placed on the eye. It can clearly be seen that the lens body 2 has a supporting edge 21 which rests on the sclera S. The two eyelids L cover the supporting edge 21 at least partially.

Constructed in this manner, the supporting edge 21 of the lens body 2 absorbs the forces acting on the lens as the lid closes and transmits them to the relatively insensitive sclera. The cornea C remains unaffected since a gap d is left between the rear face of the lens body 2 and the surface of the cornea C. This ensures that no pressure impairment or mechanical irritation of the cornea C can occur.

Figure 3:
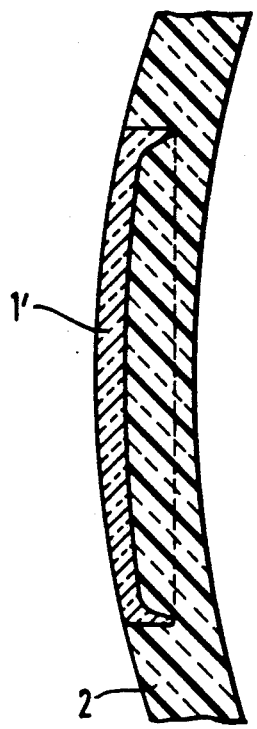
FIG. 3 is a partial view of a third embodiment of the contact lens according to the invention in section.

In the embodiment shown in FIG. 3, an optical region 1' of the contact lens has been provided on a basic lens body 2. This is a contact lens of the "clip-in-optic" type. The optical lens part 1' provides, in combination with the basic lens body 2, the required optical effect. It is also possible to obtain other functions, such as, for example, mechanical stability, UV-absorption, etc., by appropriate combination of the properties of the materials of the basic lens body 2 and the optical lens part 1'. The properties of the materials of the optical lens part 1' and the basic lens body 2 may be completely different from each other. For example, they may be hard and/or soft and flexible. The optical lens part 1' may be joined to the basic lens body 2 separably or inseparably. Suitable joining techiques are gluing, clipping, laser-welding or other known methods. The two parts 1' and 2 can be series-produced separately in large numbers at low cost. Overall, therefore, a high rationalisation effect is achieved. Above all, the connecting surfaces between the optical lens part 1' and the basic lens body 2 are independent of the topography of the cornea and, therefore, the shaping thereof can largely be standardised. In this embodiment, the basic lens body 2 assumes mainly the function of a carrier and is pre-eminently responsible for the spontaneous tolerability.

The optical lens part 1' has substantially only an optical function and can therefore be manufactured from a suitable special material that would not on its own be suitable for the manufacture of the entire contact lens. Determining factors here may be, for example, insufficient mechanical stability, too high a brittleness, too low an oxygen-permeability and also too high a price of the material for the optical lens part 1'. It is also not absolutely essential for the optical lens part 1' to have a high absorption for UV radiation. The properties that the optical lens part 1' does not have are then supplied by the basic lens body 2.

Above all, those properties which ensure the necessary transport of lachrymal fluid between the lens body and the surface of the eye can be provided by the basic lens body 2. In addition, the basic lens body 2 may also be formed of gas-permeable, especially oxygen-permeable, material.

The optical lens part 1' may possess any desired special optical property, especially also a multifocal or also toroidal lens effect. By combining the two standard components, the lenses required in any particular case can be completed to the customer's wishes immediately before delivery, with the result that a high degree of rationalisation is achieved in the production of the lenses in spite of individual lenses.

Figure 5:
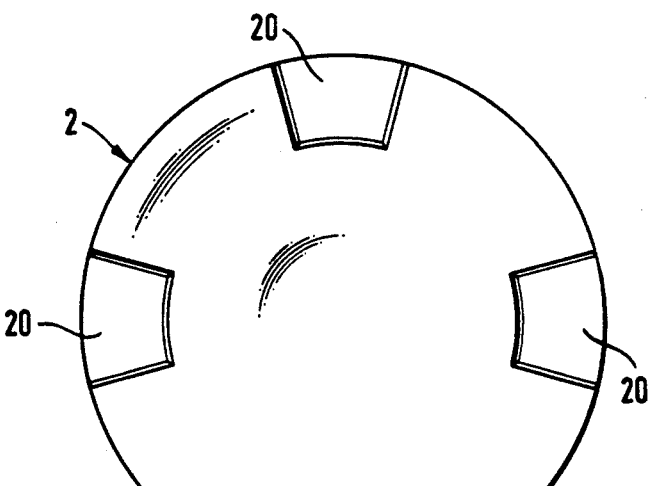
FIGS. 5 to 7 are views of three embodiments of the rear face of the contact lens.
Figure 6:
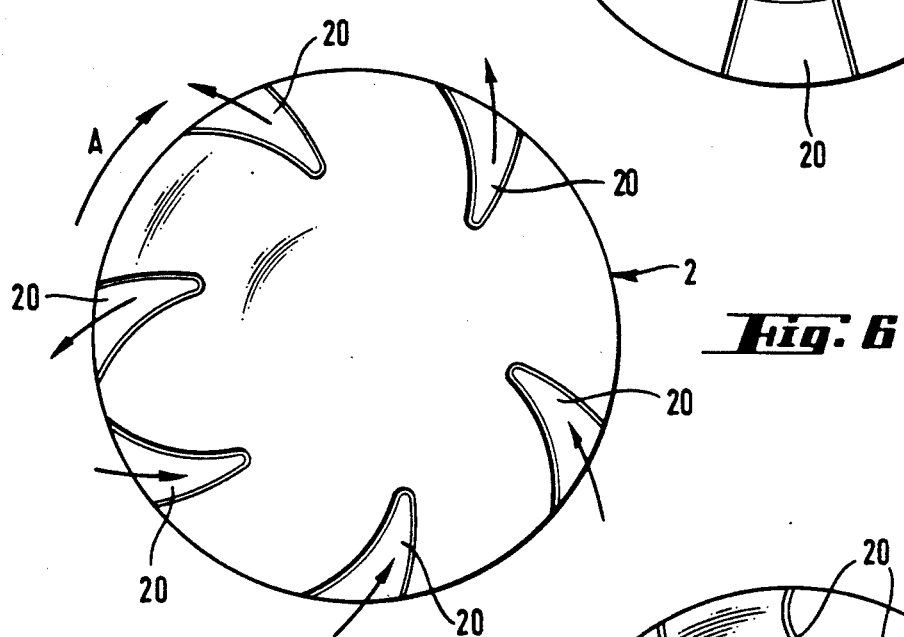
Figure 7:
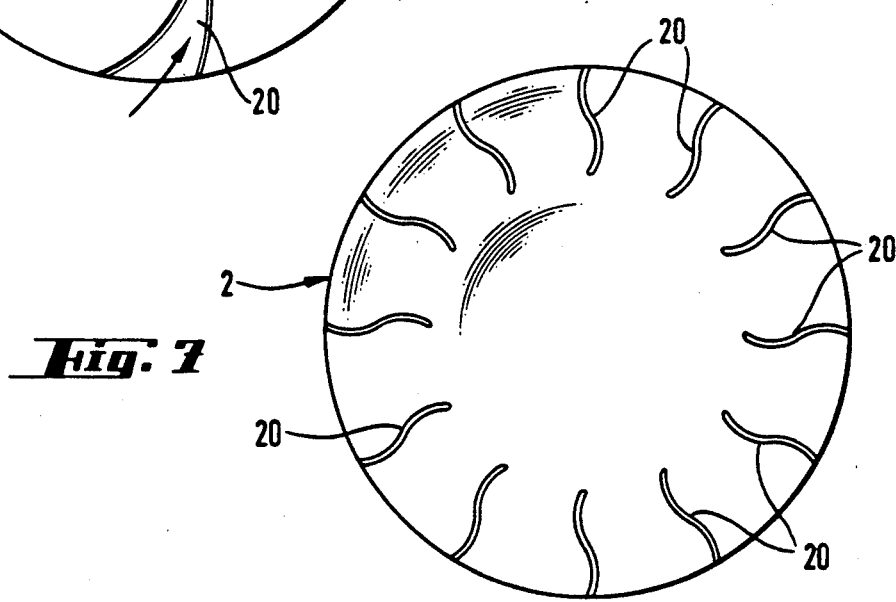

On the rear faces of the lenses, there may be provided, especially in the region of the edge of the lens, means for tear transport 20, especially depressions, so that, for example, as the lens rotates, the lachrymal film flows or is pumped preferably towards the centre in one portion of the contact lens and preferably towards the edge of the contact lens in another portion. This promotes the exchange of the lachrymal film. For example, the depressions 20 in the rear face of the lens body 2 are of groove-like (FIG. 5) or saw-tooth-like (FIG. 6) construction. It is also possible, however, to provide thin wave-like curved channels 20 that extend approximately radially from the edge of the lens to about half the radius of the lens (FIG. 7).

The lachrymal film can also be exchanged by means of the contact lens's being reversibly elastically deformed in certain regions by the closing of the lid. By means of this reversible elastic deformation it is possible to achieve a pumping effect on the lachrymal film similar to that in the case of a diaphragm pump.

For exchanging the lachrymal film there may also be provided on the edge of the lens a gently undulating ground surface, which creates flow channels. In addition, flat channels provided directly on the inner face or also the provision of partial edge thickenings (plus lenticular) are possible for promoting the exchange of the lachrymal film. An increase in the mechanical stability of the contact lens can also be at least partially achieved by this.

A few embodiments of contact lens materials for hard and flexible contact lenses, and their associated permeabilities for Oxygen Dk are given below.

| | Dk value $\times 10^{-11} \left[ \dfrac{cm^2}{s} \times \dfrac{ml\ O_2}{ml \cdot mm\ Hg} \right]$ |
|---|---|
| PMMA (polymethyl-methacrylate) | <1 |
| CAB (cellulose acetobutyrate) | 9 |
| silicone copolymers | 54 |
| fluorosilicone acrylates | 70–150 |
| fluorocarbon polymers | 100 |
| silicone rubber | 130 |

What is claimed is:

1. A contact lens having a lens body, wherein when said lens body is placed on an eye
    said lens body has a supporting edge which rests on the sclera of said eye and is covered at least partially by both eyelids and absorbs forces acting on said lens as said lids close;
    said lens body has a rear face which in the region of the cornea of said eye is spaced from the surface of said cornea; and
    means for transporting lachrymal fluid for the purpose of exchanging a lachrymal film between said rear face of said lens body and a front surface of said eye are provided in or on said lens body.

2. A contact lens according to claim 1, wherein said means for transporting said lachrymal fluid are provided in the region of said supporting edge on said rear face of said lens body.

3. A contact lens according to claim 2, wherein said means for transporting said lachrymal fluid are constructed as channels.

4. A contact lens according to claim 1, wherein said lens body has a diameter from about 10 to 17 mm.

5. A contact lens according to claim 4, wherein said diameter is from 12.5 to 13.5 mm.

6. A contact lens according to claim 1, wherein a distinct spatial separation exists between said supporting edge and an optical zone of said lens body.

7. A contact lens according to claim 1, wherein, for the purpose of transporting said lachrymal fluid, said lens body is so shaped in the region of said edge zone that said lens body placed on said eye rotates owing to the dynamics of the closing of said lids.

8. A contact lens according to claim 1, wherein, for the purpose of transporting said lachrymal fluid, said lens body is so shaped in the region of said edge zone that said lens body placed on said eye oscillates owing to the dynamics of the closing of said lids.

9. A contact lens according to claim 1, wherein said lens body is constructed to be reversibly elastically deformable in order to achieve a pumping effect caused by the closing of said lids.

10. A contact lens according to claim 1, wherein said lens body consists of a gas-permeable material.

11. A contact lens according to claim 10, wherein said material is oxygen-permeable.

12. A contact lens according to claim 1, wherein said lens body comprises two parts, an optical lens part and a basic lens body, said optical lens part being provided in said basic lens body.

13. A contact lens according to claim 12, wherein at least said basic lens body is formed of a gas-permeable material.

14. A process for manufacturing a contact lens having a supporting edge which rests on the sclera of the eye of a wearer and covered at least partially by both eyelids and which absorbs the forces acting on the lens as the lids close, said lens body having a rear face which, in the region of the cornea of the eye, is spaced from the surface of the cornea and having means for transporting lachrymal fluid between the rear face and a front surface of the eye, comprising the steps of:

scanning three-dimensionally the corneal and scleral topography of the eye;

storing geometrical values corresponding to the scanned topography; and shaping said lens according to said stored values.

15. A process according to claim 14, wherein said lens is formed by moulding.

16. A process according to claim 14, wherein said lens is formed by machining with cutting tools.

17. A process according to claim 14, wherein said lens is formed by laser-machining.

* * * * *